US012660746B2

(12) United States Patent
Ingalls et al.

(10) Patent No.: US 12,660,746 B2
(45) Date of Patent: Jun. 23, 2026

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventors: Garin R. Ingalls, Lititz, PA (US); Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 252 days.

(21) Appl. No.: 18/493,193

(22) Filed: Oct. 24, 2023

(65) Prior Publication Data

US 2025/0127079 A1 Apr. 24, 2025

(51) Int. Cl.
| | |
|---|---|
| *A01D 34/00* | (2006.01) |
| *A01D 34/66* | (2006.01) |
| *A01D 34/74* | (2006.01) |
| *A01D 101/00* | (2006.01) |

(52) U.S. Cl.
CPC .......... *A01D 34/006* (2013.01); *A01D 34/66* (2013.01); *A01D 34/74* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 6,804,597 B1 | 10/2004 | Posselius et al. | |
| 10,575,454 B2 | 3/2020 | De Nale et al. | |
| 2005/0015189 A1* | 1/2005 | Posselius ............. | A01B 79/005 |
| | | | 701/50 |
| 2013/0014480 A1 | 1/2013 | Arnold et al. | |
| 2014/0083071 A1* | 3/2014 | Fay, II ................... | A01D 45/00 |
| | | | 56/14.7 |
| 2015/0101304 A1* | 4/2015 | Rude ...................... | A01D 34/00 |
| | | | 56/228 |
| 2021/0185928 A1 | 6/2021 | Fillep et al. | |
| 2022/0078314 A1 | 3/2022 | Roth et al. | |
| 2022/0377963 A1 | 12/2022 | Fay, II | |
| 2022/0397899 A1* | 12/2022 | Horesh ............. | G01C 21/1656 |

* cited by examiner

*Primary Examiner* — Brandon D Lee
(74) *Attorney, Agent, or Firm* — Dority & Manning, P.A.

(57) ABSTRACT

A system for controlling the operation of an agricultural implement includes a cutting assembly configured to be pivoted between the first and second sides of a vehicle centerline. Additionally, the system includes a pivot actuator configured to pivot the cutting assembly between the first and second sides. Furthermore, the system includes an imaging device configured to generate data depicting a portion of the field. Moreover, the system includes a computing system configured to receive input that the implement is at the end of the field. Additionally, the computing system is configured to determine the location of the uncut crop material based on the data. Furthermore, after receipt of the input that the implement is at the end of the field, the computing system is configured to control the operation of the pivot actuator such that the cutting assembly is pivoted based on the determined location of the uncut crop material.

18 Claims, 5 Drawing Sheets

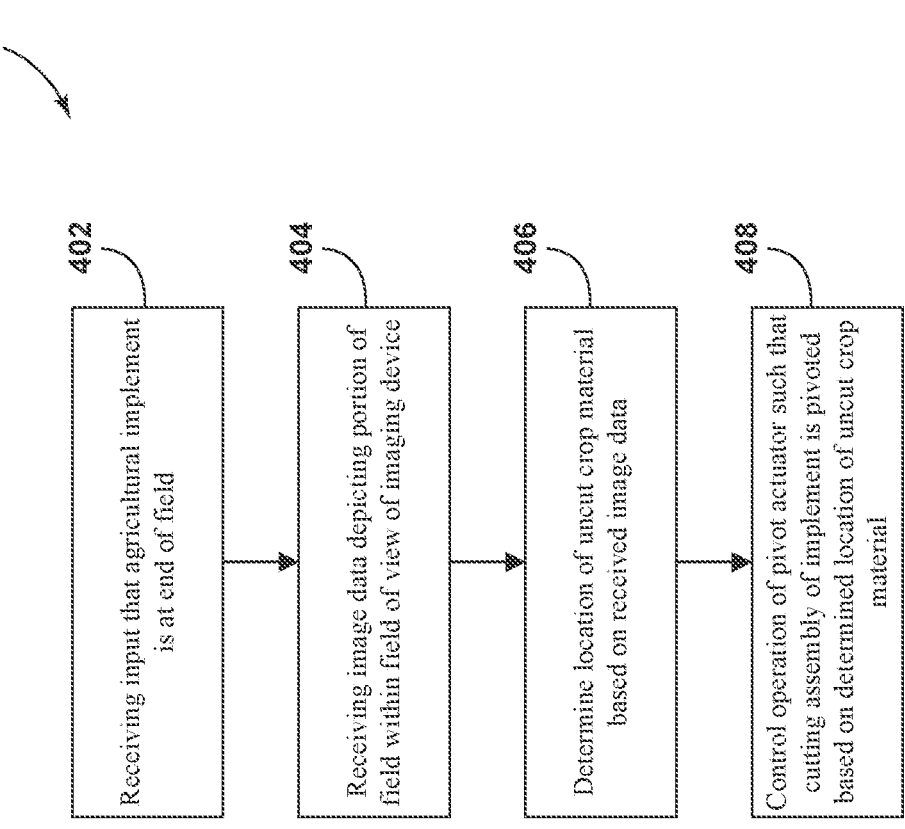

400

402 Receiving input that agricultural implement is at end of field

404 Receiving image data depicting portion of field within field of view of imaging device 406 Determine location of uncut crop material based on received image data 408 Control operation of pivot actuator such that cutting assembly of implement is pivoted based on determined location of uncut crop material

FIG. 5

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to a system and method for controlling the operation of an agricultural implement.

BACKGROUND OF THE INVENTION

Agricultural implements, such as agricultural mowers, are often employed to cut hay and/or other standing plants, such as grass, in a field. A typical mower system includes a mower, which may be pulled by an agricultural towing vehicle such as a tractor or similar vehicle. Agricultural towing vehicles often tow mowers across the length of the field in strips or belts called swaths. As the agricultural towing vehicle and the mower approach the end of a swath, and, thus, the end of the field, operators are required to simultaneously perform several tasks to prepare the vehicle and the mower for turning. In this respect, various systems and/or methods for controlling the operation of the agricultural implement when turning around have been developed. While such systems and/or methods work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of an agricultural implement. The system includes a cutting assembly including a plurality of crop-engaging blades for cutting crop material as an agricultural implement traverses a field. The cutting assembly is configured to be pivoted between first and second sides of a centerline of an agricultural vehicle extending parallel to a direction of travel. Additionally, the system includes a pivot actuator configured to pivot the cutting assembly between the first and second sides of the centerline such that the agricultural implement cuts crop material on the first side of the centerline when the cutting assembly is pivoted to the first side and cuts crop material on the second side of the centerline when the cutting assembly is pivoted to the second side. Furthermore, the system includes an imaging device configured to generate data depicting a portion of the field present within a field of view of the imaging device. Moreover, the system includes a computing system communicatively coupled to the imaging device. The computing system is configured to receive an input indicating that the agricultural implement is at an end of the field. Additionally, the computing system is configured to determine a location of uncut crop material relative to the agricultural vehicle based on the data generated by the imaging device. Furthermore, after receipt of the input that the agricultural implement is at the end of the field, the computing system is configured to control an operation of the pivot actuator such that the cutting assembly of the agricultural implement is pivoted based on the determined location of the uncut crop material.

In another aspect, the present subject matter is directed to a method for controlling the operation of an agricultural implement. The agricultural implement includes a cutting assembly including a plurality of crop-engaging blades for cutting crop material as the agricultural implement traverses a field. The cutting assembly is configured to be pivoted between first and second sides of a centerline of an agricultural vehicle extending parallel to a direction of travel. The method includes receiving, with a computing system, an input indicating the agricultural implement is at an end of the field. Additionally, the method includes receiving, with the computing system, image data depicting a portion of the field within a field of view of an imaging device. Furthermore, the method includes determining, with the computing system, a location of uncut crop material within the field relative to the agricultural vehicle based on the received image data. Moreover, after receipt of the input that the agricultural implement is at the end of the field, the method includes controlling, with the computing system, an operation of a pivot actuator to pivot the cutting assembly of the agricultural implement based on the determined location of the uncut crop material.

In another aspect, the present subject matter is directed to an agricultural implement. The agricultural implement includes a frame and a cutting assembly supported on the frame. The cutting assembly includes a plurality of crop-engaging blades for cutting crop material as the agricultural implement traverses a field. Additionally, the agricultural implement includes a tow bar coupled to the frame of the agricultural implement and configured to be coupled to an agricultural vehicle. The tow bar is pivotable relative to the agricultural vehicle such that the cutting assembly is pivotable between first and second sides of a centerline of the agricultural vehicle extending parallel to a direction of travel. Furthermore, the agricultural implement includes a pivot actuator configured to pivot the cutting assembly between the first and second sides of the centerline such that the agricultural implement cuts crop material on the first side of the centerline when pivoted to the first side and cuts crop material on the second side of the agricultural vehicle when pivoted to the second side. Moreover, the agricultural implement includes an imaging device configured to generate data depicting a portion of the field present within a field of view of the imaging device. Additionally, the agricultural implement includes a computing system communicatively coupled to the imaging device. The computing system is configured to receive an input that the agricultural implement is at an end of the field. Furthermore, the computing system is configured to determine a location of uncut crop material based on the data generated by the imaging device. Moreover, after receipt of the input that the agricultural implement is at the end of the field, the computing system is configured to control an operation of the pivot actuator such that the cutting assembly of the agricultural implement is pivoted based on the determined location of the uncut crop material.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 illustrates a flow diagram of one embodiment of a method for controlling the operation of an agricultural implement in accordance with aspects of the present subject matter.

Figure 1:
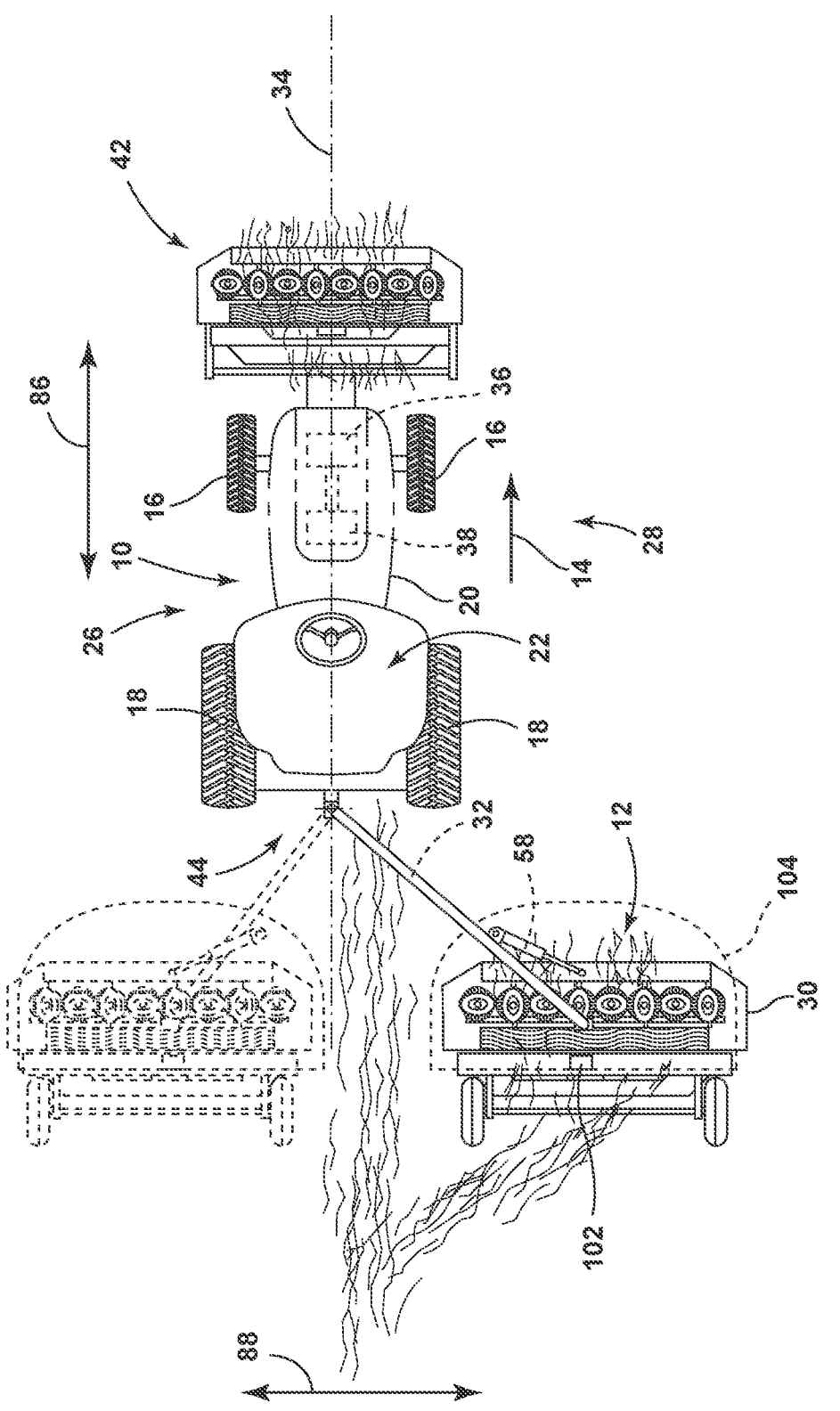
FIG. 1 illustrates a top view of one embodiment of an agricultural vehicle towing an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural implement, such as a center-pivot mower. As will be described below, the agricultural implement includes a frame and a cutting assembly supported on the frame. The cutting assembly, in turn, includes a plurality of crop-engaging blades, such as a plurality of disc cutter blades, for cutting crop material (e.g., stalks, grass, etc.) as the implement traverses the field. Additionally, the implement includes a tow bar coupled to the frame of the implement and configured to be coupled to an agricultural vehicle, such as a tractor. The tow bar may be pivotable relative to the vehicle such that the cutting assembly is pivotable between the first and second sides of a centerline of the vehicle. In this respect, the implement includes one or more pivot actuators (e.g., pneumatic pivot actuators) configured to pivot the cutting assembly between the first and second sides of the centerline of the vehicle.

Furthermore, a computing system of the disclosed system is configured to control the operation of the pivot actuator(s) to pivot the cutting assembly of the implement based on a determined location of uncut crop material relative to the vehicle, such as the first or second side of the centerline of the vehicle. More specifically, the computing system is configured to receive image data from one or more imaging devices depicting a portion(s) of the field within a field(s) of view of the imaging device(s). As such, the computing system may be configured to determine the location of the uncut crop material within the field relative to the vehicle based on the received image data. For example, in several embodiments, the computing system is configured to determine the height of the crop material on the first and second sides of the centerline and compare the determined height of the crop material on the first side of the centerline to the determined height of the crop material on the second side of the centerline. Then, the computing system is configured to determine that the location of the uncut crop material is on the first side when the determined height of the crop material on the first side exceeds the determined height of the crop material on the second side by a predetermined height range. Likewise, the computing system is configured to determine that the location of the uncut crop material is on the second side when the determined height of the crop material on the second side exceeds the determined height of the crop material on the first side by the predetermined height range. Thereafter, the computing system may be configured to control the operation of the pivot actuator(s) to pivot the cutting assembly of the implement, such as to the first side or the second side of the centerline, based on the determined location of the uncut crop material.

Pivoting the cutting assembly of the agricultural implement based on the location of uncut crop material improves the operation of the implement. More specifically, the operator may need to pivot the cutting assembly between the sides of the agricultural vehicle towing the implement while simultaneously performing a plurality of additional tasks to prepare the implement and vehicle for turning, which distracts the operator from other operations. However, the disclosed system and method can automatically determine the location of uncut crop material and control the operation of the actuator(s) such that the cutting assembly of the implement is pivoted based on the determined location of the uncut crop material. As such, the operator has fewer tasks to perform to prepare the implement and vehicle for turning and may focus on other operations.

Figure 2:
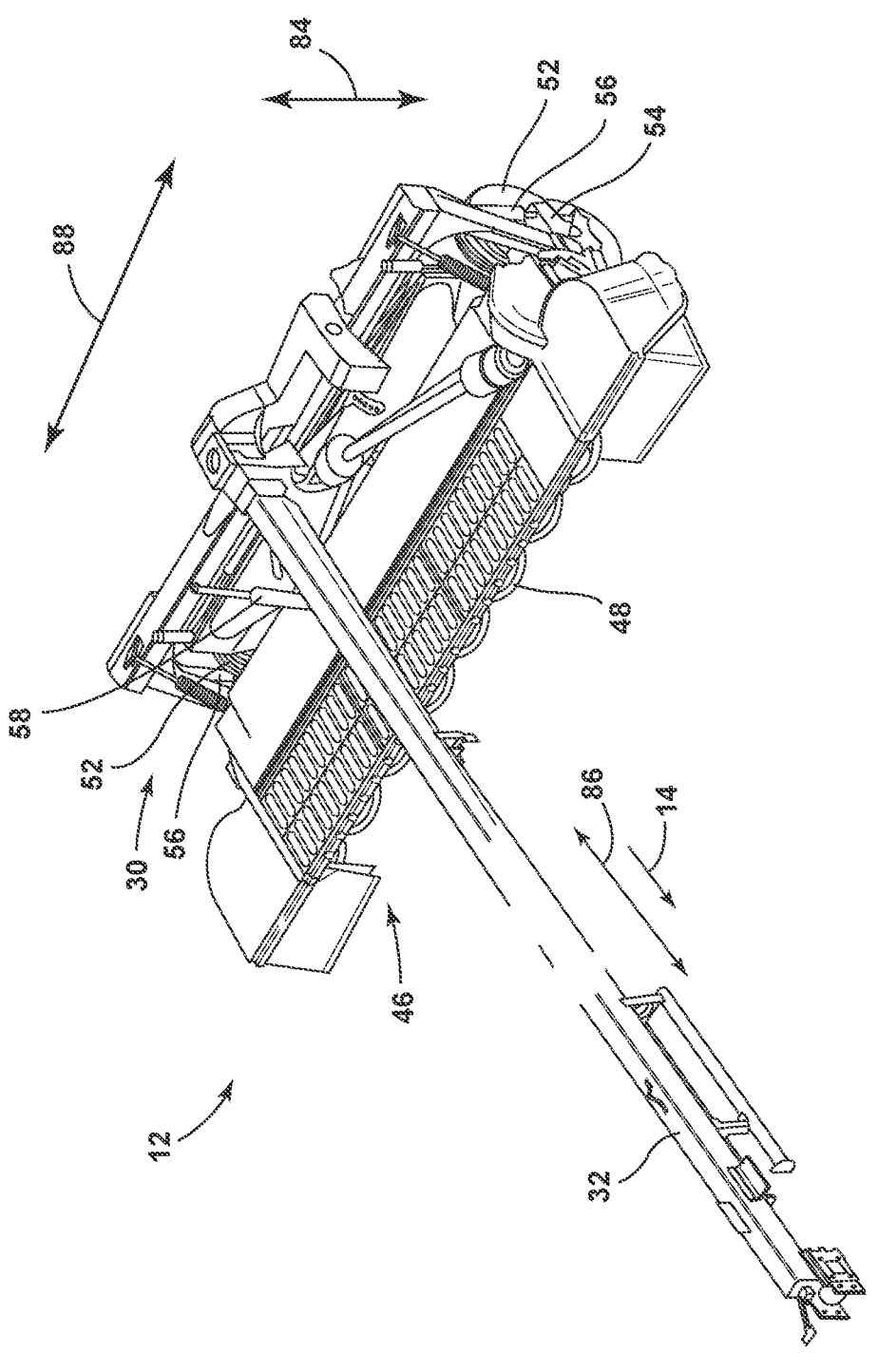
FIG. 2 illustrates a perspective view of the agricultural implement shown in FIG. 1 in accordance with aspects of the present subject matter.

Referring now to the drawings, FIGS. 1 and 2 illustrate differing views of one embodiment of an agricultural vehicle 10 and an agricultural implement 12 in accordance with aspects of the present subject matter. Specifically, FIG. 1 illustrates a top view of the agricultural vehicle 10 towing the agricultural implement 12 across a field in a travel direction (e.g., as indicated by arrow 14). Furthermore, FIG. 2 illustrates a perspective view of one embodiment of the agricultural implement 12 configured as a center-pivot mower.

In the illustrated embodiment, the agricultural vehicle 10 is configured as an agricultural tractor and the agricultural implement 12 is configured as an agricultural mower, such as a center-pivot mower. However, in other embodiments, the agricultural vehicle 10 may be configured as any other suitable agricultural or other type of work vehicle. Similarly, in other embodiments, the agricultural implement 12 may be configured as any other suitable agricultural implement configured to be towed by an agricultural vehicle.

As shown in FIG. 1, a centerline 34 of the agricultural vehicle 10 extends between a forward end 42 and an aft end 44 of the vehicle 10 in a longitudinal direction (indicated by arrow 86) parallel to the direction of travel (indicated by arrow 14). Additionally, the vehicle 10 extends between a first side 26 and a second side 28 of the centerline 34 in a lateral direction (indicated by arrow 88) perpendicular to the longitudinal direction 86. Furthermore, the vehicle 10 includes a pair of front wheels 16, a pair or rear wheels 18, and a vehicle frame or chassis 20 coupled to and supported by the wheels 16, 18. However, in other embodiments, the vehicle 10 may include track assemblies (not shown) in addition to or in lieu of the wheels. An operator's cab 22 may be supported by a portion of the vehicle chassis 20 and may house various input devices for permitting an operator to control the operation of one or more components of the vehicle 10 and/or one or more components of the implement 12. Moreover, the agricultural vehicle 10 may include an engine 36 and a transmission 38 mounted on the chassis 20. The transmission 38 may be operably coupled to the engine 36 and may provide variably adjusted gear ratios for transferring engine power to the pair of front wheels 16 and/or the pair of rear wheels 18.

As shown in FIG. 2, the implement 12 may include an implement chassis or frame 30 and a cutting assembly 46 supported on the implement frame 30. The cutting assembly 46 may include a plurality of crop-engaging blades 48, such as disc cutter blades for cutting crop material as the implement 12 traverses the field. Each crop-engaging blade 48 may be configured to rotate about an axis of rotation relative to the implement frame 30. Such rotation of the crop-engaging blades 48 severs the crop material from the field surface as the implement 12 traverses the field. However, it should be appreciated that the plurality of crop-engaging blades 48 may be configured as any suitable blade for cutting crop material, such as sickle bars and/or the like.

Furthermore, the implement 12 may include a pair of wheels 52 coupled to the implement frame 30 for moving the cutting assembly 46 as the implement 12 traverses the field. As shown in FIG. 2, the wheels 52 are coupled to the implement frame 30 by a pair of movable trailing arms 54 for raising and lowering the wheels 52 relative to the implement frame 30. In this respect, the pair of moveable trailing arms 54 allow the cutting assembly 46 to be adjusted (e.g., raised or lowered) relative to the field surface in a vertical direction (as indicated by arrow 84) perpendicular to the longitudinal direction 86 and the lateral direction 88. The cutting assembly 46 of the implement 12 may need to be adjusted (e.g., raised) when the vehicle 10 and the implement 12 are turning, such as when the implement 12 has completed mowing a swath of the field the vehicle 10 and implement 12 are turning to begin cutting a different swath of the field.

Additionally, the implement 12 may include one or more wheel actuators 56 configured to raise and lower the cutting assembly 46 of the implement 12 relative to the field. For example, in several embodiments, the wheel actuator(s) 56 may be coupled between the implement frame 30 and the respective moveable trailing arm 54. In this respect, the wheel actuator(s) 56 is configured to move the pair of movable trailing arms 54 relative to the implement frame 30 such that the cutting assembly 46 may be raised or lowered. For example, when the wheel actuator(s) 56 is extended, the cutting assembly 46 is raised. Conversely, when the wheel actuator(s) 56 is retracted, the cutting assembly 46 is lowered. It should be appreciated that the wheel actuator(s) 56 may be configured as any suitable actuator(s) configured to raise and lower the cutting assembly 46 relative to the field. For example, the wheel actuator(s) 56 may be configured as a hydraulic or pneumatic actuator(s) and/or the like.

As shown in FIG. 1, the implement frame 30 is configured to be towed by the vehicle 10 via a pull hitch or tow bar 32 in the direction of travel 14 of the vehicle/implement 10/12. The tow bar 32 may be coupled to the implement frame 30 and the vehicle 10. Additionally, the tow bar 32 may be pivotable relative to the vehicle 10, such as in the lateral direction 88, such that the cutting assembly 46 is pivotable between the first side 26 and the second side 28 of the centerline 34 as the vehicle 10 traverses the field. In this respect, the plurality of crop-engaging blades 48 may cut crop material on the first side 26 of the centerline 34 when pivoted to the first side 26 or on the second side 28 of the centerline 34 when pivoted to the second side 28. As such, driving the vehicle 10 through uncut crop material can be avoided as the vehicle 10 traverses the field over previously cut areas while the plurality of crop-engaging blades 48 cut crop material on the first side 26 or the second side 28 of the centerline 34 of the vehicle 10.

Moreover, the implement 12 may include one or more pivot actuators 58 configured to pivot the cutting assembly 46 of the implement 12 between the first side 26 and the second side 28 of the centerline 34 of the vehicle 10. For example, as shown in FIG. 2, the implement 12 includes the pivot actuator 58 coupled between the tow bar 32 and the implement frame 30 of the implement 12. In this respect, when the pivot actuator 58 is extended, the cutting assembly 46 moves to the second side 28 of the centerline 34 of the vehicle 10. Alternatively, when the pivot actuator 58 is retracted, the cutting assembly 46 moves to the first side 26 of the centerline 34 of the vehicle 10.

Furthermore, the implement 12 and/or the vehicle 10 may include one or more imaging devices 102 coupled thereto and/or supported thereon. The imaging device(s) 102 is configured to generate data depicting a portion of the field within a field(s) of view 104 of the imaging device(s) 102. For example, the data may be data of uncut crop material within the field(s) of view 104 of the imaging device(s) 102. Such data may subsequently be used to control the operation of the wheel actuator(s) 56 to adjust (e.g., raise or lower) the implement frame 30 and control the operation of the pivot actuator(s) 58 to pivot the cutting assembly 46 of the implement 12 to the first side 26 or the second side 28 of the centerline 34 of the vehicle 10.

In general, the imaging device(s) 102 may correspond to any suitable imaging device(s) configured to generate data depicting the portion of the field within the field(s) of view 104 of the imaging device(s) 102. In several embodiments, the imaging device(s) 102 may be configured as a light detection and ranging (LiDAR) imaging device(s). However, in alternative embodiments, the imaging device(s) 102 may be configured as any other suitable imaging device(s) for generating data depicting the portion of the field within the field(s) of view 104 of the imaging device(s) 102. For example, the imaging device(s) 102 may be configured as a camera(s), radar(s), and/or the like.

Furthermore, the implement 12 and/or the vehicle 10 may include any number of imaging devices 102 provided at any suitable location that allows data depicting the portion of the field within the field(s) of view 104 of the imaging device(s) to be generated. In this respect, FIG. 1 illustrates an example location for mounting the imaging device(s) 102 for generating data depicting the portion of the field within the field(s) of view 104 of the imaging device(s) 102. For example, the imaging device(s) 102 is mounted on the implement frame 30 of the implement 12 such that the imaging device(s) 102 has the field(s) of view 104 of the field on the first side 26 and the second side 28 of the vehicle 10 forward of the implement 12. In this respect, the imaging device(s) 102 may generate data depicting the portion of the field on the first side 26 and the second side 28 of the vehicle 10. However, in alternative embodiments, the imaging device(s) 102 may be installed at any other suitable location(s) that allows the device(s) to generate data depicting the portion of the field within the field(s) of view 104 of the imaging device(s) 102.

Figure 3:
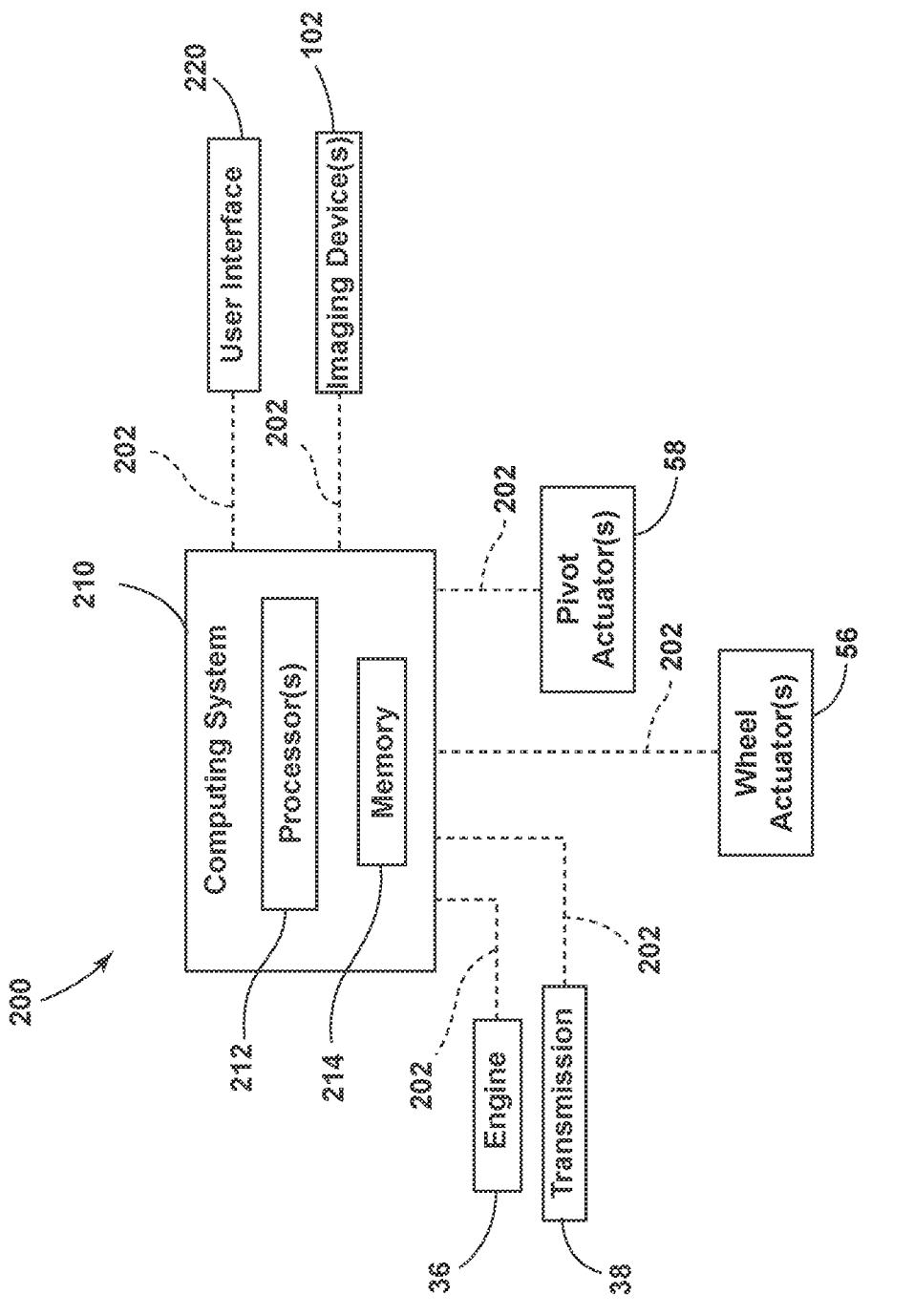
FIG. 3 illustrates a schematic view of one embodiment of a system for controlling the operation of an agricultural implement in accordance with aspects of the present subject matter.

Referring now to FIG. 3, a schematic view of one embodiment of a system 200 for controlling the operation of an agricultural implement is illustrated in accordance with aspects of the present subject matter. In general, the system 200 will be described herein with reference to the agricultural vehicle 10 and the implement 12 described above with reference to FIGS. 1-2. However, it should be appreciated that the disclosed system 200 may generally be utilized with agricultural vehicles having any suitable vehicle configuration and/or implements having any suitable implement configuration.

As shown in FIG. 3, the system 200 includes a computing system 210 communicatively coupled to one or more components of the implement 12, the agricultural vehicle 10, and/or the system 200 to allow the operation of such components to be electronically or automatically controlled by the computing system 210. For instance, the computing system 210 may be communicatively coupled to the imaging device(s) 102 via a communicative link 202. As such, the computing system 210 may be configured to receive data from the imaging device(s) 102 depicting the portion of the field within the field(s) of view 104 of the imaging device(s) 102. Moreover, the computing system 210 may be communicatively coupled to the pivot actuator(s) 58 and the wheel actuator(s) 56. As such, the computing system 210 may be configured to control the operation of the wheel actuator(s) 56 to raise and lower the implement frame 30 of the implement 12 relative to the field. Likewise, the computing system 210 may be configured to control the operation of the pivot actuator(s) 58 to pivot the cutting assembly 46 of the implement 12 between the first side 26 and the second side 28 of the centerline 34 of the vehicle 10. Furthermore, the computing system 210 may be communicatively coupled to the engine 36 and/or the transmission 38 of the vehicle 10 via the communicative link 202. In this respect, the computing system 210 may be configured to control the operation of the engine 36 and/or the transmission 38 to adjust the ground speed at which the agricultural vehicle 10 and, thus, the implement 12 travels across the field. In addition, the computing system 210 may be communicatively coupled to any other suitable components of the implement 12, the vehicle 10, and/or the system 200.

In general, the computing system 210 may comprise any suitable processor-based device known in the art, such as a given controller or computing device or any suitable combination of controllers or computing devices. Thus, in several embodiments, the computing system 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the implement 12 and/or the agricultural vehicle 10, itself, or the computing system 210 may correspond to a separate processing device. For instance, in one embodiment, the computing system 210 may form all or part of a separate plug-in module that may be installed in association with the implement 12 and/or the agricultural vehicle 10 to allow for the disclosed systems to be implemented without requiring additional software to be uploaded onto existing control devices of the implement 12 and/or the agricultural vehicle 10.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

In addition, the system 200 may also include a user interface 220. More specifically, the user interface 220 may be configured to provide feedback, such as feedback associated with the uncut crop material, to the operator. As such, the user interface 220 may include one or more feedback devices (not shown), such as display screens, speakers, warning lights, and/or the like, which are configured to provide feedback from the computing system 210 to the operator. As such, the user interface 220 may, in turn, be communicatively coupled to the computing system 210 via the communicative link 202 to permit the feedback to be transmitted from the computing system 210 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. In one embodiment, the user interface 220 may be mounted or otherwise positioned within the operator's cab 22 of the agricultural vehicle 10. However, in alternative embodiments, the user interface 220 may mounted at any other suitable location.

Figure 4:
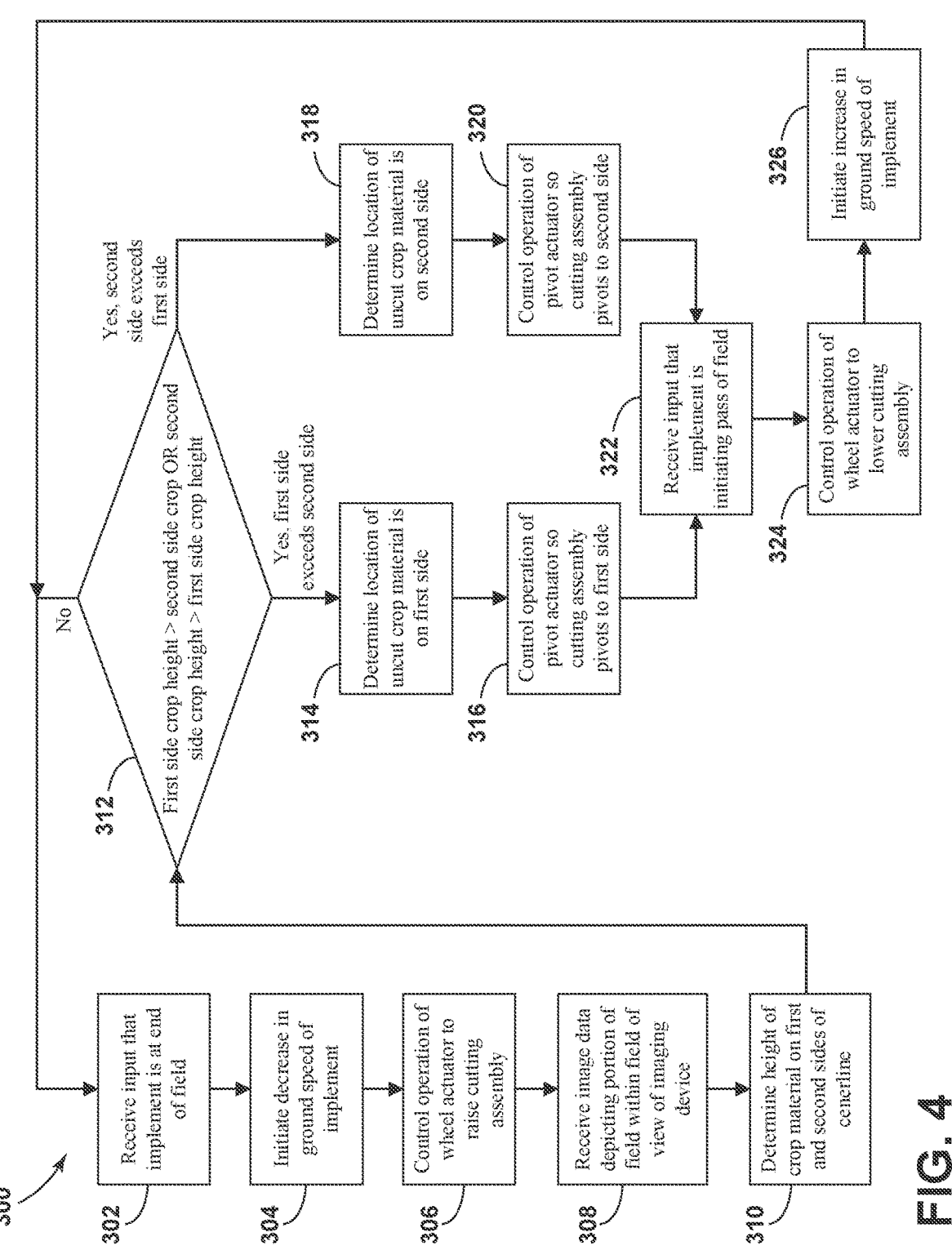
FIG. 4 illustrates a flow diagram of one embodiment of control logic for controlling the operation of an agricultural implement in accordance with aspects of the present subject matter.

Referring now to FIG. 4, a flow diagram of one embodiment of control logic 300 that may be executed by the computing system 210 (or any other suitable computing system) for controlling the operation of an agricultural implement is illustrated in accordance with aspects of the present subject matter. Specifically, the control logic 300 shown in FIG. 4 is representative of steps of one embodiment of an algorithm that can be executed to control the operation of an agricultural implement such that a cutting assembly of the agricultural implement is pivoted based on a determined location of uncut crop material. Thus, in several embodiments, the control logic 300 may be advantageously utilized in association with a system installed on or forming part of an agricultural implement to allow for real-time control of the operation of the implement without requiring substantial computing resources and/or processing time. However, in other embodiments, the control logic 300 may be used in association with any other suitable system, application, and/or the like for controlling the operation of an agricultural implement.

As shown in FIG. 4, at (302), the control logic 300 includes receiving an input indicating that an agricultural implement is at an end of the field. Specifically, as mentioned above, in several embodiments, the computing system 210 may be communicatively coupled to the user interface 220 via the communicative link 202. In this respect, the computing system 210 may receive the input from the operator of the implement 12 that the implement 12 is at the end of the field. However, it should be appreciated that the computing system 210 may receive the input in any other suitable manner. For example, the computing system 210 may receive an input from a global positioning system (GPS).

Additionally, at (304), the control logic 300 includes initiating a decrease in a ground speed of the agricultural implement. Specifically, as mentioned above, in several embodiments, the computing system 210 may be communicatively coupled to the engine 36 and/or the transmission 38. As such, the computing system 210 may be configured to transmit instructions to the engine 36 and/or the transmission 38 (e.g., via the communicative link 202) instructing the engine 36 to decrease its power output and/or the transmission 38 to downshift to decrease the ground speed and/or stop/halt movement of the agricultural vehicle 10 and/or the implement 12. However, in alternative embodiments, the computing system 210 may be configured to transmit instructions to any other suitable components (e.g., braking actuators) of the agricultural vehicle 10 and/or the implement 12 such that the ground speed of the agricultural vehicle 10 and/or the implement 12 is decreased. Furthermore, it should be appreciated that any other suitable parameter(s) the agricultural vehicle 10 and/or the implement 12 may be adjusted after receipt of the input that the implement 12 is at the end of the field.

Furthermore, at (306), after receipt of the input that the agricultural implement is at the end of the field, the control logic 300 includes controlling an operation of a wheel actuator to raise the cutting assembly of the agricultural implement. Specifically, after receipt of the input at (302), the computing system 210 may be configured to control the operation of the wheel actuator(s) 56 to raise the cutting assembly 46 of the implement 12.

Moreover, at (308), the control logic includes receiving image data depicting a portion of the field within a field of view of the imaging device. Specifically, as mentioned above, in several embodiments, the computing system 210 may be communicatively coupled to the imaging device(s) 102 via the communicative link 202. In this respect, as the implement 12 is towed across the field by the vehicle 10 to perform an agricultural operation (e.g., a mowing operation) thereon, the computing system 210 may receive the image data from the imaging device(s) 102 via the communicative link 202. Such image data, in turn, depicts the portion of the field within the field(s) of view 104 of the imaging device(s) 102, such as the first side 26 and the second side 28 of the centerline 34 of the vehicle 10.

Additionally, at (310), the control logic 300 includes determining the height of the crop material on the first and second sides 26, 28 of the centerline 34 of the vehicle 10 based on the received image data. In this respect, in several embodiments, the computing system 210 may be configured to determine the height of the crop material on the first and second sides 26, 28 of the centerline 34 based on the image data received at (308). It should be appreciated that the computing system 210 may be configured to determine the height of the crop material on the first and second sides 26, 28 of the centerline 34 based on the received image data using any suitable image processing technique.

Furthermore, as shown in FIG. 4, at (312), the control logic 300 includes comparing the determined height of the crop material on the first side of the centerline to the determined height of the crop material on the second side of the centerline. As such, in several embodiments, the computing system 210 may be configured to compare the determined height of the crop material on the first side 26 of the centerline 34 to the determined height of the crop material on the second side 28 of the centerline 34. Thereafter, when the determined height of the crop material on the first side 26 of the centerline 34 exceeds the determined height of the crop material on the second side 28 of the centerline 34 by a predetermined height range, the control logic 300 proceeds to (314). Alternatively, when the determined height of the crop material on the second side 28 of the centerline 34 exceeds the determined heigh of the crop material on the first side 26 of the centerline 34 by the predetermined height range, the control logic proceeds to (316). Otherwise, the control logic 300 returns to (302). Furthermore, the predetermined height range may be a maximum height range in which the height of a cut crop material falls within.

Moreover, at (314), the control logic 300 includes determining that the location of the uncut crop material is on the first side of the centerline when the determined height of the crop material on the first side of the centerline exceeds the determined height of the crop material on the second side of the centerline by the predetermined height range. In this respect, in several embodiments, the computing system 210 may be configured to determine the that the location of the uncut crop material is on the first side 26 of the centerline 34 when the determined height of the crop material on the first side 26 of the centerline 34 exceeds the determined height of the crop material on the second side 28 of the centerline 34 by the predetermined height range. Thereafter, the control logic 300 proceeds to (316).

Additionally, as shown in FIG. 4, at (316), the control logic 300 includes controlling the operation of the pivot actuator such that the cutting assembly of the agricultural implement is pivoted to the first side of the centerline when determined that the location of the uncut crop material is on the first side. Specifically, the computing system 210 may be configured to control the operation of the pivot actuator(s) 58 such that the cutting assembly 46 of the implement 12 is pivoted to the first side 26 of the centerline 34 when the determined location of the uncut crop material is on the first side 26. For example, in some embodiments, the computing system 210 may be configured to control the operation of the pivot actuator 58 such that the pivot actuator 58 is retracted. Thereafter, the control logic 300 proceeds to (322).

Furthermore, at (318), the control logic 300 includes determining that the location of the uncut crop material is on the second side of the centerline when the determined height of the crop material on the second side of the centerline exceeds the determined height of the crop material on the first side of the centerline by the predetermined height range. In this respect, in several embodiments, the computing system 210 may be configured to determine the that the location of the uncut crop material is on the second side 28 of the centerline 34 when the determined height of the crop material on the second side 28 of the centerline 34 exceeds the determined height of the crop material on the first side 26 of the centerline 34 by the predetermined height range. Thereafter, the control logic 300 proceeds to (320).

Moreover, at (320), the control logic 300 includes controlling the operation of the pivot actuator such that the cutting assembly of the agricultural implement is pivoted to the second side of the centerline when determined that the location of the uncut crop material is on the second side. Specifically, the computing system 210 may be configured to control the operation of the pivot actuator(s) 58 such that the cutting assembly 46 of the implement 12 is pivoted to the second side 28 of the centerline 34 when the determined location of the uncut crop material is on the second side 28. For example, in some embodiments, the computing system 210 may be configured to control the operation of the pivot actuator 58 such that the pivot actuator 58 is extended. Thereafter, the control logic 300 proceeds to (322).

Additionally, as shown in FIG. 4, at (322), the control logic 300 includes receiving an input that the agricultural implement is initiating a pass of the field. Specifically, the computing system 210 may receive the input from the operator (e.g., via the user interface 220) of the implement 12 that the implement 12 is initiating the pass of the field. However, it should be appreciated that the computing system 210 may receive the input in any other suitable manner. For example, the computing system 210 may receive an input from a global positioning system (GPS).

Furthermore, at (324), after receipt of the input that the agricultural implement is initiating the pass of the field, the control logic 300 includes controlling the operation of the wheel actuator to lower the cutting assembly of the agricultural implement. Specifically, after receipt of the input at (322), the computing system 210 may be configured to control the operation of the wheel actuator(s) 56 to lower the cutting assembly 46 of the implement 12.

Moreover, at (326), after receipt of the input that the agricultural implement is initiating the pass of the field, the control logic 300 includes initiating an increase in the ground speed of the agricultural implement. Specifically, the computing system 210 may transmit instructions to the engine 36 and/or the transmission 38 (e.g., via the communicative link 202) instructing the engine 36 to increase its power output and/or the transmission 38 to upshift to increase the ground speed of the agricultural vehicle 10 and/or the implement 12. Furthermore, it should be appreciated that any other suitable parameter(s) the agricultural vehicle 10 and/or the implement 12 may be adjusted after receipt of the input that the implement 12 is initiating the pass of the field. Upon completion of (326), the control logic 300 returns to (302).

Referring now to FIG. 5, a flow diagram of one embodiment of a method 400 for controlling the operation of an agricultural implement is illustrated in accordance with aspects of the present subject matter. In general, the method 400 will be described herein with reference to the agricultural implement 12 and the agricultural vehicle 10 shown in FIGS. 1-2 and the system 200 described with reference to FIGS. 3 and 4. However, it should be appreciated that the disclosed method 400 may be implemented with agricultural vehicles and/or agricultural implements having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 5, at (402), the method 400 may include receiving an input that the agricultural implement is at an end of the field. For instance, as indicated above, the computing system 210 may be configured to receive an input, such as an operator input from the user interface 220, that the implement 12 is at the end of the field.

Furthermore, at (404), the method 400 may include receiving image data depicting a portion of the field within a field of view of an imaging device. For instance, as indicated above, in several embodiments, the computing system 210 may be configured to receive the image data depicting the portion of the field within the field(s) of view 104 of the imaging device(s) 102.

Additionally, at (406), the method 400 may include determining the location of uncut crop material based on the received image data. For instance, as indicated above, in several embodiments, the computing system 210 may be configured to determine the location of the uncut crop material (e.g., first side 26 or second side 28 of the centerline 34 of the vehicle 10) based on the received image data.

Moreover, at (408), after receipt of the input that the agricultural implement is at the end of the field, the method 400 may include controlling an operation of a pivot actuator such that the cutting assembly of the agricultural implement is pivoted based on the determined location of the uncut crop material. For instance, as indicated above, in several embodiments, the computing system 210 may be configured to control an operation of the pivot actuator(s) 58 such that the cutting assembly 46 of the implement 12 is pivoted, for example, to the first side 26 or the second side 28 of the centerline 34 of the vehicle 10, based on the determined location of the uncut crop material.

It is to be understood that the steps of the control logic 300 and the method 400 are performed by the computing system 210 upon loading and executing software code or instructions which are tangibly stored on one or more tangible computer readable media, such as one or more magnetic media (e.g., a computer hard drive(s)), one or more optical media (e.g., an optical disc(s)), solid-state memory (e.g., flash memory), and/or other storage media known in the art. Thus, any of the functionality performed by the computing system 210 described herein, such as the control logic 300 and the method 400, is implemented in software code or instructions which are tangibly stored on one or more tangible computer readable media. The computing system 210 loads the software code or instructions via a direct interface with the one or more computer readable media or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computing system, such as one or more computers or one or more controllers. They may exist in a computer-executable form, such as machine code, which is the set of instructions and data directly executed by a computing system's central processing unit(s) or by a controller(s), a human-understandable form, such as source code, which may be compiled in order to be executed by a computing system's central processing unit(s) or by a controller(s), or an intermediate form, such as object code, which is produced by a compiler. As used herein, the term "software code" or "code" also includes any human-understandable computer instructions or set of instructions (e.g., a script), that may be executed on the fly with the aid of an interpreter executed by a computing system's central processing unit(s) or by a controller(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for controlling the operation of an agricultural implement, the system comprising:

a cutting assembly including a plurality of crop-engaging blades for cutting crop material as an agricultural implement traverses a field, the cutting assembly configured to be pivoted between first and second sides of a centerline of an agricultural vehicle extending parallel to a direction of travel;

a pivot actuator configured to pivot the cutting assembly between the first and second sides of the centerline such that the agricultural implement cuts crop material on the first side of the centerline when the cutting assembly is pivoted to the first side and cuts crop material on the second side of the centerline when the cutting assembly is pivoted to the second side;

an imaging device configured to generate data depicting a portion of the field present within a field of view of the imaging device; and a computing system communicatively coupled to the imaging device, the computing system configured to:

receive an input indicating that the agricultural implement is at an end of the field;

identify a side at which uncut crop material is located based on the data generated by the imaging device, wherein the identified side is one of the first side or the second side of the centerline; and after receipt of the input that the agricultural implement is at the end of the field, control an operation of the pivot actuator such that the cutting assembly of the agricultural implement is pivoted to the identified side.

2. The system of claim 1, wherein identifying the side at which the uncut crop material is located comprises:

determining a height of the crop material on the first and second sides of the centerline based on the data generated by the imaging device;

comparing the determined height of the crop material on the first side of the centerline to the determined height of the crop material on the second side of the centerline;

identifying that the uncut crop material is located on the first side of the centerline in response to the determined height of the crop material on the first side of the centerline exceeding the determined height of the crop material on the second side of the centerline by a predetermined height range; and identifying that the uncut crop material is located on the second side of the centerline in response to the determined height of the crop material on the second side of the centerline exceeding the determined height of the crop material on the first side of the centerline by the predetermined height range.

3. The system of claim 2, wherein controlling the operation of the pivot actuator comprises:

controlling the operation of the pivot actuator such that the cutting assembly of the agricultural implement is pivoted to the first side of the centerline in response to identifying that the location of the uncut crop material is on the first side; and controlling the operation of the pivot actuator such that the cutting assembly of the agricultural implement is pivoted to the second side of the centerline in response to identifying that the location of the uncut crop material is on the second side.

4. The system of claim 1, wherein, after receipt of the input that the agricultural implement is at the end of the field, the computing system is further configured to:

initiate a decrease in a ground speed of the agricultural implement.

5. The system of claim 1, further comprising:

a wheel actuator configured to raise and lower the cutting assembly of the agricultural implement relative to the field, and wherein, after receipt of the input that the agricultural implement is at the end of the field, the computing system is further configured to:

control an operation of the wheel actuator to raise the cutting assembly of the agricultural implement.

6. The system of claim 1, wherein, after controlling the operation of the pivot actuator such that the cutting assembly of the agricultural implement is pivoted, the computing system is further configured to:

receive an input that the agricultural implement is initiating a pass of the field; and after receipt of the input that the agricultural implement is initiating the pass of the field, initiate an increase in a ground speed of the agricultural implement.

7. The system of claim 5, wherein, after controlling the operation of the pivot actuator such that the cutting assembly of the agricultural implement is pivoted, the computing system is further configured to:

receive an input that the agricultural implement is initiating a pass of the field; and after receipt of the input that the agricultural implement is initiating the pass of the field, controlling the operation of the wheel actuator to lower the cutting assembly of the agricultural implement.

8. A method for controlling the operation of an agricultural implement, the agricultural implement including a cutting assembly including a plurality of crop-engaging blades for cutting crop material as the agricultural implement traverses a field, the cutting assembly configured to be pivoted between first and second sides of a centerline of an agricultural vehicle extending parallel to a direction of travel, the method comprising:

receiving, with a computing system, an input indicating that the agricultural implement is at an end of the field;

receiving, with the computing system, image data depicting a portion of the field within a field of view of an imaging device;

identifying, with the computing system, a side at which uncut crop material is located based on the received image data, wherein the identified side is one of the first side or the second side of the centerline; and after receipt of the input that the agricultural implement is at the end of the field, controlling, with the computing system, an operation of a pivot actuator such that the cutting assembly of the agricultural implement is pivoted to the identified side.

9. The method of claim 8, wherein identifying the side at which the uncut crop material is located comprises:

determining, with the computing system, a height of the crop material on the first and second sides of the centerline based on the received image data;

comparing, with the computing system, the determined height of the crop material on the first side of the centerline to the determined height of the crop material on the second side of the centerline;

identifying, with the computing system, that the uncut crop material is located on the first side of the centerline in response to the determined height of the crop material on the first side of the centerline exceeding the determined height of the crop material on the second side of the centerline by a predetermined height range; and identifying, with the computing system, that the uncut crop material is located on the second side of the centerline in response to the determined height of the crop material on the second side of the centerline exceeding the determined height of the crop material on the first side of the centerline by the predetermined height range.

10. The method of claim 9, wherein controlling the operation of the pivot actuator comprises:

controlling, with the computing system, the operation of the pivot actuator such that the cutting assembly of the agricultural implement is pivoted to the first side of the centerline in response to identifying that the location of the uncut crop material is on the first side; and controlling, with the computing system, the operation of the pivot actuator such that the cutting assembly of the agricultural implement is pivoted to the second side of the centerline in response to identifying that the location of the uncut crop material is on the second side.

11. The method of claim 8, wherein, after receipt of the input that the agricultural implement is at the end of the field, the method further comprises:

initiating, with the computing system, a decrease in a ground speed of the agricultural implement.

12. The method of claim 8, further comprising:

after receipt of the input that the agricultural implement is at the end of the field, controlling, with the computing system, an operation of a wheel actuator to raise the cutting assembly of the agricultural implement.

13. The method of claim 8, wherein after controlling the operation of the pivot actuator such that the cutting assembly of the agricultural implement is pivoted based on the determined location of the uncut crop material, the method further comprises:

receiving, with the computing system, an input that the agricultural implement is initiating a pass of the field; and after receipt of the input that the agricultural implement is initiating the pass of the field, initiating, with the computing system, an increase in a ground speed of the agricultural implement.

14. The method of claim 12, wherein after controlling the operation of the pivot actuator such that the cutting assembly of the agricultural implement is pivoted based on the determined location of the uncut crop material, the method further comprises:

receiving, with the computing system, an input that the agricultural implement is initiating a pass of the field; and after receipt of the input that the agricultural implement is initiating the pass of the field, controlling, with the computing system, the operation of the wheel actuator to lower the cutting assembly of the agricultural implement.

15. An agricultural implement, comprising:

a frame;

a cutting assembly supported on the frame, the cutting assembly including a plurality of crop-engaging blades for cutting crop material as the agricultural implement traverses a field;

a tow bar coupled to the frame of the agricultural implement and configured to be coupled to an agricultural vehicle, the tow bar pivotable relative to the agricultural vehicle such that the cutting assembly is pivotable between first and second sides of a centerline of the agricultural vehicle extending parallel to a direction of travel;

a pivot actuator configured to pivot the cutting assembly between the first and second sides of the centerline such that the agricultural implement cuts crop material on the first side of the centerline when pivoted to the first side and cuts crop material on the second side of the centerline when pivoted to the second side;

an imaging device configured to generate data depicting a portion of the field present within a field of view of the imaging device; and a computing system communicatively coupled to the imaging device, the computing system configured to:

receive an input that the agricultural implement is at an end of the field;

identify a side at which uncut crop material is located based on the data generated by the imaging device, wherein the identified side is one of the first side or the second side of the centerline; and after receipt of the input that the agricultural implement is at the end of the field, control an operation of the pivot actuator such that the cutting assembly of the agricultural implement is pivoted to the identified side.

16. The agricultural implement of claim 15, wherein identifying the side at which the uncut crop material is located comprises:

determining a height of the crop material on the first and second sides of the centerline based on the data generated by the imaging device;

comparing the determined height of the crop material on the first side of the centerline to the determined height of the crop material on the second side of the centerline;

identifying that the uncut crop material is located on the first side of the centerline in response to the determined height of the crop material on the first side of the centerline exceeding the determined height of the crop material on the second side of the centerline by a predetermined height range; and identifying that the uncut crop material is located on the second side of the centerline in response to the determined height of the crop material on the second side of the centerline exceeding the determined height of the crop material on the first side of the centerline by the predetermined height range.

17. The agricultural implement of claim 16, wherein controlling the operation of the pivot actuator comprises:

controlling the operation of the pivot actuator such that the cutting assembly of the agricultural implement is pivoted to the first side of the centerline in response to identifying that the location of the uncut crop material is on the first side; and controlling the operation of the pivot actuator such that the cutting assembly of the agricultural implement is pivoted to the second side of the centerline in response to identifying that the location of the uncut crop material is on the second side.

18. The agricultural implement of claim 15, further comprising:

a wheel actuator configured to raise and lower the cutting assembly of the agricultural implement relative to the field, and wherein, after receipt of the input that the agricultural implement is at the end of the field, the computing system is further configured to:

control an operation of the wheel actuator to raise the cutting assembly of the agricultural implement.

* * * * *